United States Patent Office 3,751,423
Patented Aug. 7, 1973

3,751,423
TRICHLOROETHYLIDENE-AMINO-THIAZOLES
Pal Benko, Zoltan Budai, Laszlo Pallos, and Edit Berenyi, Budapest, Hungary, assignors to Egyt Gyogyszervegyeszeti Gyar
No Drawing. Original application Apr. 10, 1969, Ser. No. 815,238, now Patent No. 3,624,088. Divided and this application June 17, 1971, Ser. No. 154,178
Claims priority, application Hungary, Apr. 12, 1968, EE–1,505
Int. Cl. C07d 91/34
U.S. Cl. 260—306.8 R                3 Claims

ABSTRACT OF THE DISCLOSURE

Compounds of the formula

A—N=CH—CCl$_3$ wherein A is a thiazolyl-2 which may be unsubstituted or substituted by one nitro group or one or two methyl groups, and the pharmaceutically acceptable acid addition salts thereof.

The new compounds exert anthelmintic and herbicidal activity.

CROSS-REFERENCE TO PRIOR APPLICATION

This is a divisional application of our application Ser. No. 815,238 filed Apr. 10, 1969, now Pat. No. 3,624,088.

The invention relates to the preparation of new β,β,β-trichloroethylidene amine derivatives having anthelmintic and fungicide activity.

It has been found that the new β,β,β-trichloroethylidene amine derivatives of the general Formula I A—N=CH—CCl$_3$        (I)

wherein A represents a quinolyl group unsubstituted or substituted by halogen, lower alkyl or nitro groups, a 2-thiazolyl group unsubstituted or substituted by one or two methyl groups or a tetrahydronaphthyl group, have valuable anthelmintic and fungicide properties and can be used also as intermediate products for the preparation of further valuable compounds, e.g. of formamidine derivatives having anthelmintic and herbicide activity.

These new β,β,β-trichloroethylidene derivatives can be prepared by a method known per se but used hitherto only for the preparation of analogous compounds containing alkyl or phenyl groups attached to the nitrogen atom (cf. Chem. Ber. 100, 1814/1967); this method comprises reacting trichloroacetaldehyde with a quinolyl, 2-thiazolyl or tetrahydronaphthyl amine of the general Formula II

A—NH$_2$        (II)

wherein A has the same meaning as above.

This reaction may be carried out in the presence or absence of a solvent, e.g. of benzene, toluene or xylene; it is in some cases preferable to distill off the water formed during the reaction.

The new compounds of the Formula I are solid crystalline products decomposing easily under the influence of heat; some of them have low melting points or are even liquid at room temperature. Because of their heat-sensitivity they can be purified only by recrystallisation. In order to avoid the contamination of the product by unreacted trichloroacetaldehyde, it is preferable to carry out the above reaction with a slight excess of the amine of the Formula II.

The compounds of the Formula I obtained as described above may be converted into acid addition salts by the usual methods.

The anthelmintic acting of the new compounds of the general Formula I has been tested against the parasites *Enchytraeus albidus* (E), *Tubifex rivulorum* (T) and *Schistosoma mansoni cercaria* (S); the inhibiting concentrations are given in the following table; the corresponding values obtained with the following known anthelmintic agents are shown for comparison:

Yomesan®, i.e. N-(2'-chloro-4'-nitrophenyl)-5-chloro-salicylic amine (A),
Methyridin®, i.e., 2-(β-methoxyethyl)-pyridine (B) and
Miracil-D®, i.e. 1-diethylaminoethylamino-4-methylthiaxanthone (C)

| | Minimal inhibiting concentration, mg./liter | | |
|---|---|---|---|
| | (E) | (T) | (S) |
| 8-(β,β,β-trichloroethylidene)-aminoquinoline | 15.5 | 7.5–15.5 | 1.7 |
| 2-(β,β,β-trichloroethylidene)-amino-5-nitro-thiazol | 0.8 | 1.7–3.5 | 0.8 |
| 2-(β,β,β-trichloroethylidene)-amino-thiazol | 3.5 | 15.5–31 | 3.5 |
| 2-(β,β,β-trichloroethylidene)-amino-4-methyl-thiazol | 15.5 | 1.7–3.5 | 3.5 |
| 4-(β,β,β-trichloroethylidene)-amino-7-chloro-quinoline | 1.7 | 0.8 | 2.5 |
| 1-(β,β,β-trichloroethylidene)-amino-5,6,7,8-tetrahydronaphthalene | 3.5–1.7 | 31–15.5 | 2.5 |
| (A) | 15.5 | 15.5 | 31 |
| (B) | 15.5–31 | 7.5–15.5 | 15.5 |
| (C) | 3.5–7.5 | 3.5–7.5 | 7.9 |

The preparation of the new compounds is shown in more details by the following examples.

EXAMPLE 1

A mixture of 13.5 g. (0.096 mol.) of 8-amino-quinoline and 13.22 g. (0.09 mol.) of trichloroacetaldehyde in 150 ml. of benzene is refluxed for three hours and the solvent is then distilled off in vacuo. The 8-(β,β,β-trichloroethylidene)-amino-quinoline is a crystalline product melting at 58–62° C.

EXAMPLE 2

A mixture of 15.5 g. (0.1 mol.) of 2-amino-5-nitro-thiazol and 14.8 g. (0.1 mol.) of trichloroacetaldehyde in 100 ml. of benzene is refluxed for three hours, the reaction mixture is then cooled and the precipitated 2-(β,β,β-trichloroethylidene)-amino-5-nitrothiazol is collected; M.P. 187–188° C.

EXAMPLE 3

20 g. (0.2 mol.) of 2-aminothiazol are reacted with 29.48 g. (0.2 mol.) of trichloroacetaldehyde in 500 ml. of abs. benzene at 80° C.; the water formed is distilled off and separated during the reaction. After three hours the reaction product is collected by filtration. 42.3 g. of 2-(β,β,β-trichloroethylidene)-amino-thiazol (92% of the theoretical yield) are obtained; M.P. 146–147° C.

EXAMPLE 4

22.6 g. (0.19 mol.) of 2-amino-4-methyl-thiazol and 27.9 g. (0.19 mol.) of trichloroacetaldehyde in 250 ml. of benzene are refluxed for three hours. During this time the initially two-phase mixture becomes homogeneous and a precipitate appears at the end of the reaction. After cooling, the precipitate is collected by filtration; 43.5 g. 2-(β,β,β - trichloroethylidene) - amino - 4 - methyl - thiazol (89.3% of the theoretical yield) are obtained, M.P. 165–166° C. (decomp.).

EXAMPLE 5

17.86 g. (0.1 mol.) of 4-amino-7-chloro-quinoline are dissolved in 500 ml. of toluene and 14.74 g. (0.1 mol.) trichloroacetaldehyde are added thereto. After ceasing of the exotherm reaction the mixture is refluxed for six hours and then the product is collected by filtration. 23.6 g. of 4-($\beta,\beta,\beta$ - trichloroethylidene) - amino - 7 - chloro-quinoline (76.6% of the theoretical yield) are obtained; M.P. 168–169° C.

EXAMPLE 6

22.05 g. (0.15 mol.) of 1-amino-5,6,7,8-tetrahydronaphthalene and 22.11 g. (0.15 mol.) of trichloroacetaldehyde in 250 ml. of xylene are reacted at 140° C. for three hours. The reaction mixture is then evaporated in vacuo and the residue is distilled under 3 mm. mercury at 161–162° C. 21.6 g. of 1-($\beta,\beta,\beta$-trichloroethylidene)-amino-5,6,7,8-tetrahydronaphthalene (52.2% of the theoretical yield) are obtained.

What is claimed is:
1. compound of the formula

$$A-N=CH-CCl_3$$

wherein A represents a thiazolyl-2 group unsubstituted or substituted by one nitro group or one or two methyl groups.
2. 2-($\beta,\beta,\beta$-trichloroethylidene)-amino-5-nitrothiazol.
3. 2-($\beta,\beta,\beta$-trichloroethylidene)-amino-thiazol.

References Cited
UNITED STATES PATENTS
3,624,088  11/1971  Benko et al. _____ 260—306.8 R RICHARD J. GALLAGHER, Primary Examiner